United States Patent [19]

Slater

[11] Patent Number: 4,509,558

[45] Date of Patent: Apr. 9, 1985

[54] FLEXIBLE HOSE

[75] Inventor: Christopher J. Slater, Grimsby, England

[73] Assignee: Dunlop Limited, London, England

[21] Appl. No.: 423,266

[22] Filed: Sep. 24, 1982

[30] Foreign Application Priority Data

Mar. 23, 1982 [GB] United Kingdom ............... 8208402

[51] Int. Cl.³ .............................................. F16L 55/00
[52] U.S. Cl. .................................... 138/104; 138/114; 138/137; 138/141
[58] Field of Search ............... 138/103, 104, 109, 111, 138/114, 137, 141, 152, 172, 174; 73/40.5, 49.1

[56] References Cited

U.S. PATENT DOCUMENTS

| | | | |
|---|---|---|---|
| 1,883,086 | 10/1932 | Swartz | 138/109 |
| 3,172,428 | 3/1965 | Tudge | 138/172 |
| 3,339,415 | 9/1967 | Wild | 73/40.5 X |
| 3,717,180 | 2/1973 | Ambrose et al. | 138/153 |
| 3,860,043 | 1/1975 | Kutnyak et al. | 138/153 |
| 3,972,223 | 8/1976 | Torghele | 138/104 |
| 4,153,079 | 5/1979 | Ambrose | 138/104 |
| 4,259,553 | 3/1981 | Tanaka et al. | 138/104 |
| 4,349,049 | 9/1982 | Silvey | 138/104 |

FOREIGN PATENT DOCUMENTS 153320 12/1977 Japan ................................. 138/103

Primary Examiner—John W. Shepperd
Attorney, Agent, or Firm—Stevens, Davis, Miller & Mosher

[57] ABSTRACT

A flexible hose comprising a main fluid retaining carcass and a secondary carcass enclosing at least part of the main carcass, said secondary carcass being constructed to expand radially relative to said main carcass on leakage of fluid from said main carcass. Said hose includes means to control the radial expansion of said secondary carcass in a predetermined manner; said means may comprise localized bonding of said main and secondary carcasses and/or localized circumferential reinforcement of the secondary carcass.

8 Claims, 8 Drawing Figures

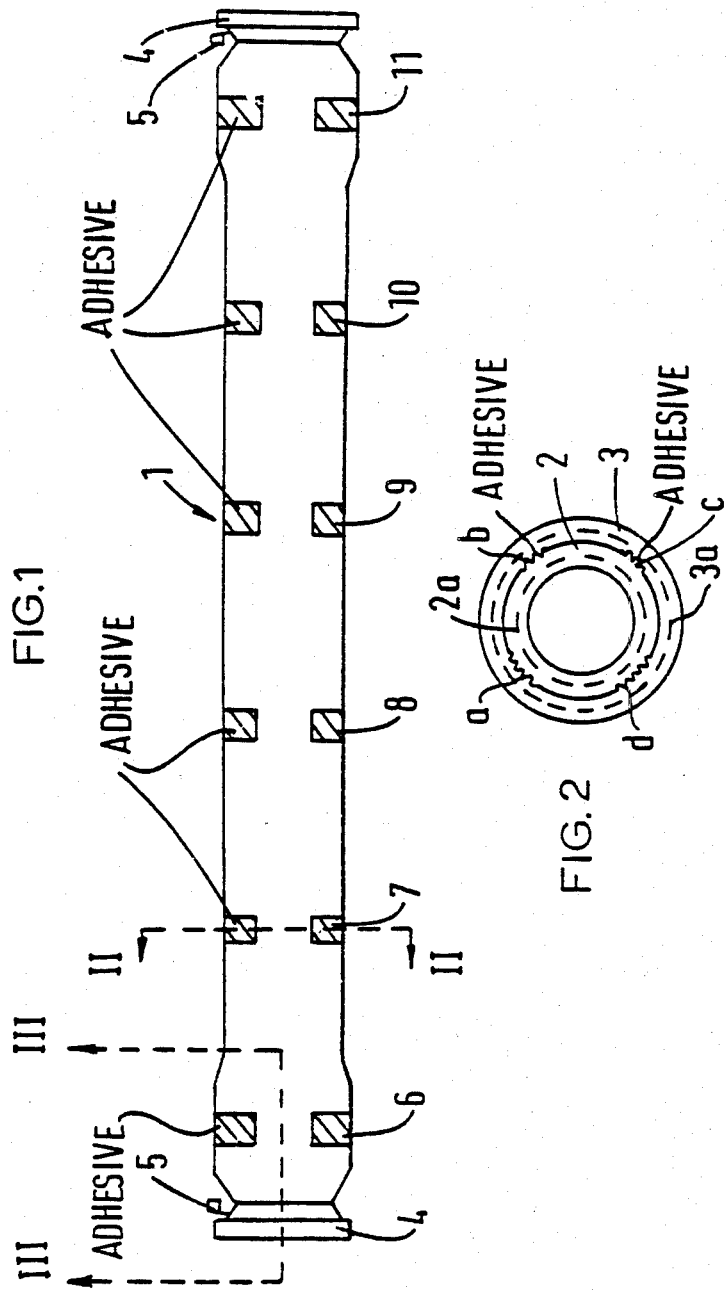

FLEXIBLE HOSE

This invention concerns improvements in or relating to flexible hose and in particular to flexible hose of the type comprising a main fluid retaining carcass and a secondary fluid retaining carcass enclosing at least part of the length of the main carcass to prevent escape of fluid leaking from the main carcass.

Flexible hose of the type referred to above is particularly useful for transporting fluids the escape of which would constitute a severe health or safety hazard and is especially suited to applications where the hose is required to withstand a considerable amount of flexing in use, rough handling during connecting operations and severe weathering, for example in the hose-line used to transport oil between a tanker moored offshore and an installation on shore.

In assignee's earlier U K Patent No. 1 503 302 a flexible hose of the type referred to above is disclosed in which the secondary carcass is separate from the main carcass and constructed to expand radially under the pressure of fluid leaking through the main carcass which is retained by the secondary carcass.

I have now found that under certain conditions excessive radial expansion of the secondary carcass may occur in the vicinity of the leak causing not only the reinforcement structure of the secondary carcass to become highly distorted but also the displacement and therefore the underwater weight of the hose to change significantly both of which are undesirable for the following reasons. The ability of the reinforcement structure to withstand the pressure of the leaked fluid is reduced by distortion of the reinforcement structure from its original configuration so that premature failure of the secondary carcass may occur. The delicate balance between added buoyancy and hose weight necessary to maintain an optimum configuration of successive hose lengths to minimize stresses in the hose line is disturbed by any significant change in the underwater weight of one of the hose lengths which may have a deleterious affect on all the hose lengths.

According to the present invention there is provided a flexible hose comprising a main fluid retaining carcass, a secondary fluid retaining carcass which encloses at least part of the main carcass and is capable of expanding radially relative to the main carcass on leakage of fluid from the main carcass wherein radial expansion of the secondary carcass relative to the main carcass is controlled in a pre-determined manner.

The extent of radial expansion of the secondary carcass relative to the main carcass may be controlled by bonding the secondary carcass to the main carcass at a plurality of positions spaced axially along the length of the hose. Bonding may be continuous in the circumferential direction but more preferably is discontinuous to allow fluid leaking from the main carcass to flow along the entire length of the enclosed part of the main carcass.

Alternatively or in addition to the aforementioned bonding of the secondary carcass to the main carcass at selected axial positions the extent of radial expansion of the secondary carcass relative to the main carcass may be controlled by reinforcing the secondary carcass at a plurality of positions spaced axially along the length of the hose. For example the secondary carcass may be reinforced by circumferentially extending hoop plies.

Where the secondary carcass is both bonded to the main carcass at selected axial positions and provided with circumferential hoop plies or similar the latter are preferably provided at the same axial positions as the bonding between the secondary and main carcasses to reinforce the bonds and control the extent of radial expansion in the event of any of the bonds failing.

By controlling the extend to which the secondary carcass may expand radially relative to the main carcass excessive local radial expansion of the secondary carcass leading to high distortion thereof and consequent reduction in burst strength is prevented. In addition significant changes in the displacement and therefore underwater weight of the hose is avoided.

Preferably the secondary carcass encloses the entire length of the main carcass and both the main and secondary carcasses are separately connected at each end to a respective end fitting.

Preferably the main and secondary carcasses each include a respective reinforcement structure. Conveniently radial expansion of the secondary carcass relative to the main carcass is effected by forming the reinforcement structure of the secondary carcass from material having a substantially higher elongation than the reinforcement of the main carcass when subjected to the pressure of the fluid conducted therein, such that, at the designated working pressure of the hose, elongation of the secondary carcass reinforcement occurs on leakage from the main carcass allowing radial expansion of the secondary carcass.

The reinforcement structure of the main and secondary carcasses may comprise one or more layers of woven or braided material or a helical winding or any combination of such layers.

Where the secondary carcass is provided with hoop plies or similar these are applied after the reinforcement structure i.e. radially outwards thereof, and formed of a material having a lower elongation than the material forming the reinforcement structure.

The hose may include low density buoyancy material to provide the desired degree of buoyancy for the use to which the hose is to be put i.e. underwater pipe lines, buoy to sea floor pipe lines or buoy to ship and/or shore pipe lines. Buoyancy material may be incorporated in the body of the main and/or secondary carcasses. Alternatively or in addition buoyancy material may be provided between the main and secondary carcasses. However irrespective of whether or not the hose includes buoyancy material the hose as formed does not have a pre-formed gap within the hose wall into which fluid leaking from the main carcass passes i.e. each layer forming the hose wall is applied directly over the preceding layer and a gap is produced within the hose wall as a result of leakage of fluid from the main carcass causing radial expansion of the secondary carcass.

The hose may be of constant or varying bore diameter such as can be used to connect hose of one diameter to manifolds of different diameter such as may be present on a ship, buoy or onshore installation.

Preferably means is provided to detect leakage of fluid from the main carcass. the leak detection means may rely on the radial expansion of the secondary carcass due to the pressure of leaked fluid, for example the hose may be provided with external surface markings which distort on expansion of the secondary carcass to give a visual warning or the hose may be provided with one or more devices extending circumferentially around the secondary carcass and operable on expansion of the secondary carcass to produce a warning signal.

More preferably the leak detection means relies on a change in fluid pressure between the main and secondary carcasses and may be of the type disclosed in assignee's co-pending U K Patent application No. 8208403 titled "Improvements in or relating to flexible hose".

The invention will now be described in more detail, by way of example only, with reference to the accompanying drawings wherein:

FIG. 1 is a side view of a hose according to the present invention;

FIG. 2 is a section on the line 2—2 of FIG. 1;

Figure 7:
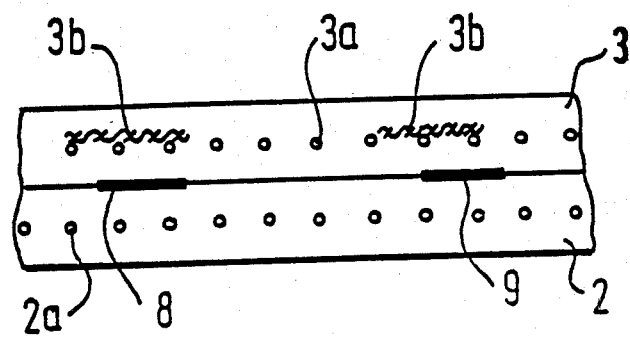
Figure 8:
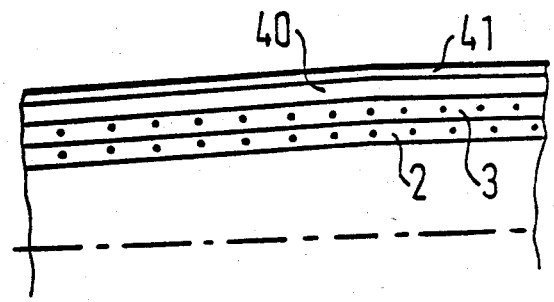

FIG. 7 is a longitudinal sectional view of part of a hose wall having hoop plies 3b, and FIG. 8 is a longitudinal section view of part of the wall of a hose having a bore a part of which is tapered and wherein the reinforcing carcasses 2,3 are surrounded by a layer of buoyancy material 40 provided under an outer cover 41.

Figure 3:
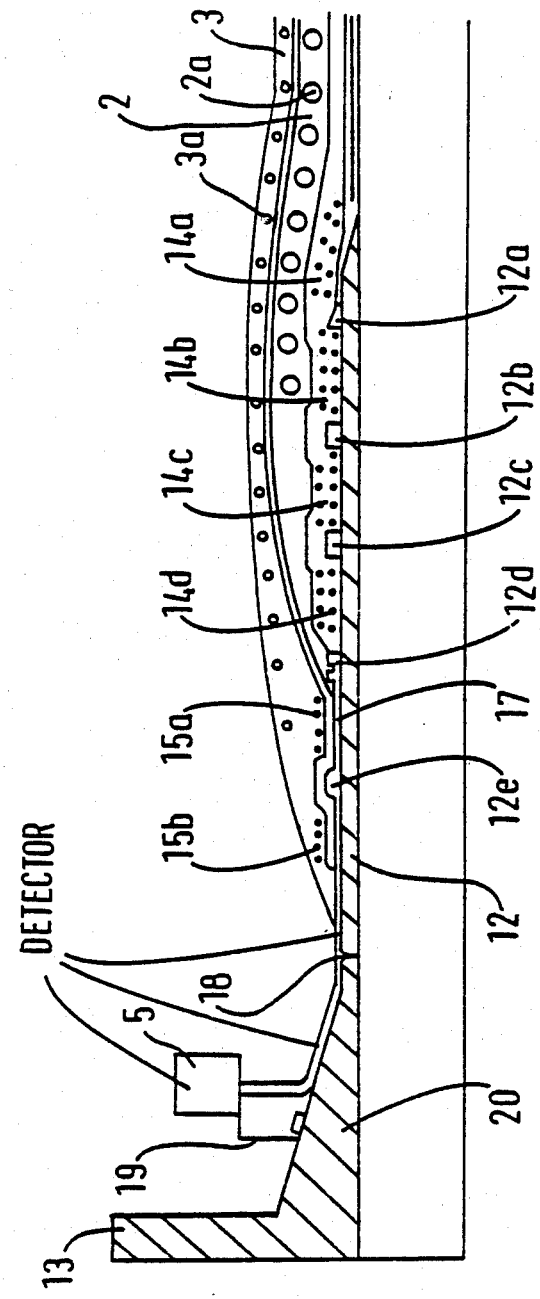
FIG. 3 is a section on the line 3—3 of FIG. 1.

The hose 1 shown in FIGS. 1 to 3 of the accompanying drawings comprises a main fluid retaining carcass 2 surrounded by and in contact with a secondary fluid retaining carcass 3, a respective end fitting 4 at each end of the hose to which the main and secondary fluid retaining carcasses 2 and 3 are secured and a respective leak detector 5 for detecting fluid leaking from the main carcass 2 mounted on each end fitting.

The main carcass 2 comprises an inner liner impermeable to the fluid to be transported, a reinforcement structure 2a and a cover. The reinforcement structure comprises several plies of steel wire cord helically wound at a lay angle of 50° (±5°) to the longitudinal axis of the hose with successive plies being of opposite hand to provide a balanced constructions and a single coil of helically wound steel wire. The secondary carcass 3 comprises an inner liner of polymeric material, a reinforcement structure 3a and a cover which forms the outer cover of the hose and is capable of withstanding the conditions to which the hose is subjected in use. The reinforcement structure comprises several plies of high extension cord helically wound at a lay angle of 60° (±5°) to the longitudinal axis of the hose with successive plies being of opposite hand to allow the secondary carcass to expand radially relative to the main carcass following leakage of fluid from the latter.

As best shown in FIGS. 1 and 2 the liner of the secondary carcass is bonded to the cover of the main carcass at six axially spaced positions, 6 through 11, along the length of the hose to control radial expansion of the secondary carcass relative to the main carcass with the bonding at each axial position being in four circumferentially spaced regions a, b, c, d, to allow leaked fluid to flow along the length of the hose to either end fitting.

In addition the secondary carcass is provided with six circumferentially extending hoop plies 3b (see FIG. 7) one at each of the axially spaced positions 6 through 11 radially outwards of the reinforcement structure and formed from a low extension cord, e.g. wire cord, wrapped around the hose. The hoop plies reinforce the bonds between the main and secondary carcasses and, being formed from cords having a lower extension than the cords of the reinforcement structure, control radial expansion of the secondary carcass in the event of any of the bonds failing due to effects of fatigue or degradation following leakage of fluid, e.g. oil, from the main carcass.

Each end fitting 4 is similar and, as shown more clearly in FIG. 3, comprises an axially extending nipple portion 12 to which corresponding one ends of the main and secondary carcasses 2 and 3 respectively are connected and a radially extending flange 13 for connection to a successive hose length (not shown) or to a fluid input/output (not shown). The nipple portion 12 has five axially spaced circumferential ribs 12a, 12b, 12c, 12d and 12e. Each end of the main carcass 2 passes over the ribs 12a, 12b and 12c and abuts the ribs 12d of the associated end fittings 14 and is connected thereto by four axially spaced inextensible beads 14a, 14b, 14c and 14d each consisting of two wire windings. The secondary carcass 3 is slightly longer than the main carcass 2 and each end of the secondary carcass 3 passes over the ribs 12d and 12e of the associated end fittings 4 and is connected thereto by two axially spaced inextensible beads 15a, 15b, each consisting of single wire winding. The rib 12d has a channel 16 formed in the radially outer surface thereof which is continuous in circumferential direction and an internal bore 17 leading from the base of channel 16 and extending in the axial direction towards the flange 13 of the associated end fitting. An axially extending small bore tube 18 connected at one end to the bore 17 projects beyond the end of the secondary carcass 3 and is connected at the other end to the leak detector 5 attached via a mounting 19 to an outwardly flared body portion 20 at the associated end fitting.

The leak detector 5 may be of any type capable of sensing variation in fluid pressure and activating a warning device, visual and/or audio, when the pressure of leaked fluid between the main and secondary carcass exceeds a predetermined level and is preferably of the type disclosed in assignee's co-pending U K Patent application No. 8208403 titled "Improvements in or relating to flexible hose".

In one method of manufacture the hose is built on a mandrel with each individual layer of the hose being applied under tension so that no gap exists between the main and secondary carcasses in the finished hose. Bonding between the main and secondary carcasses is effected by applying an appropriate bonding agent to the outer surface of the cured main carcass cover at the appropriate positions and applying a masking agent e.g. a silicone and/or polymeric material to the remainder of the outer surface of the cured main carcass cover prior to application of the secondary carcass liner so that, on curing the secondary carcass, bonding between the main carcass cover and secondary carcass liner occurs only in the areas in which the bonding agent is applied.

In use of the above described hose, fluid which leaks through main carcass 2 is retained by the secondary carcass 3 which due to the reinforcement structure thereof being formed from high extension cords expands radially to generate a gap between the main and secondary carcasses. The degree of radial expansion that can occur is controlled by the bonding between the main and secondary carcasses reinforced by the circumferential hoop plies so that the leaked fluid is constrained to flow along the length of the hose to either end fitting where its presence is detected by the associated leak detector 5. As a result excessive local radial expansion of the hose in the region of main carcass failure is prevented and detection of a leak may be effected before a large volume of fluid has leaked between the main and secondary carcasses and therefore before a significant increase in underwater weight of the hose occurs.

Figure 4:
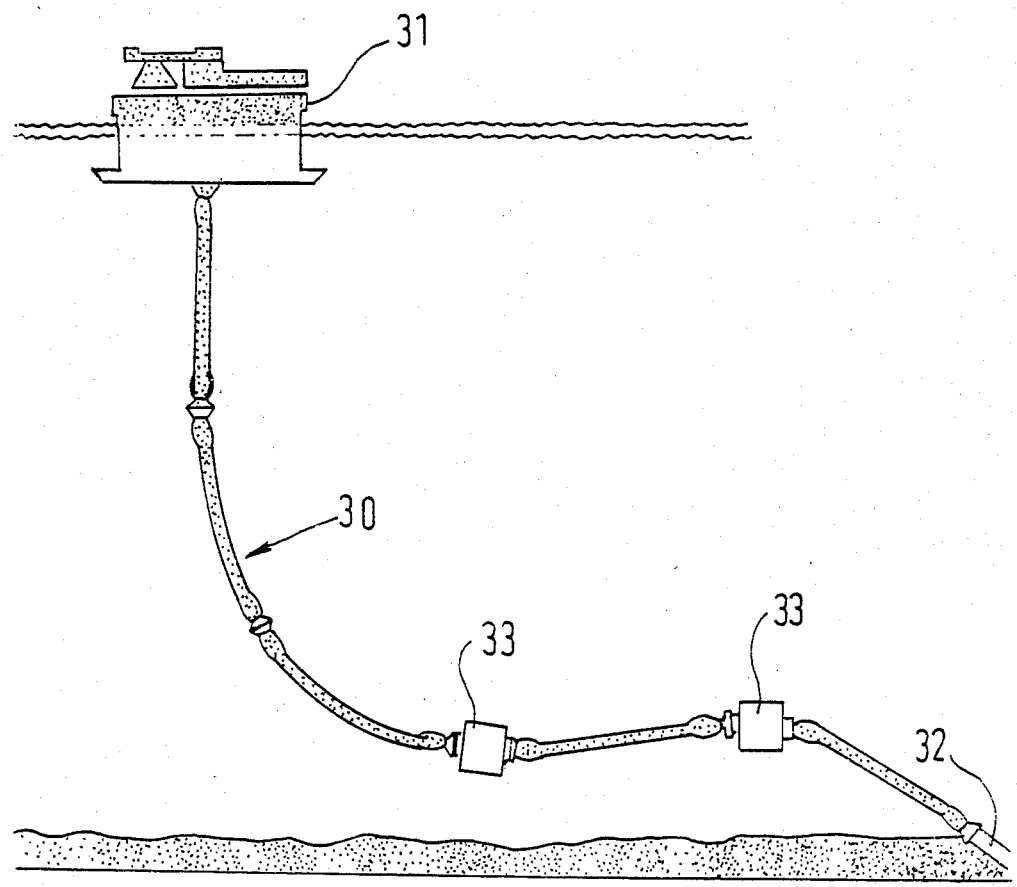
FIGS. 4, 5 and 6 are schematic representations of three installations incorporating the hose shown in FIGS. 1 to 3.
Figure 5:
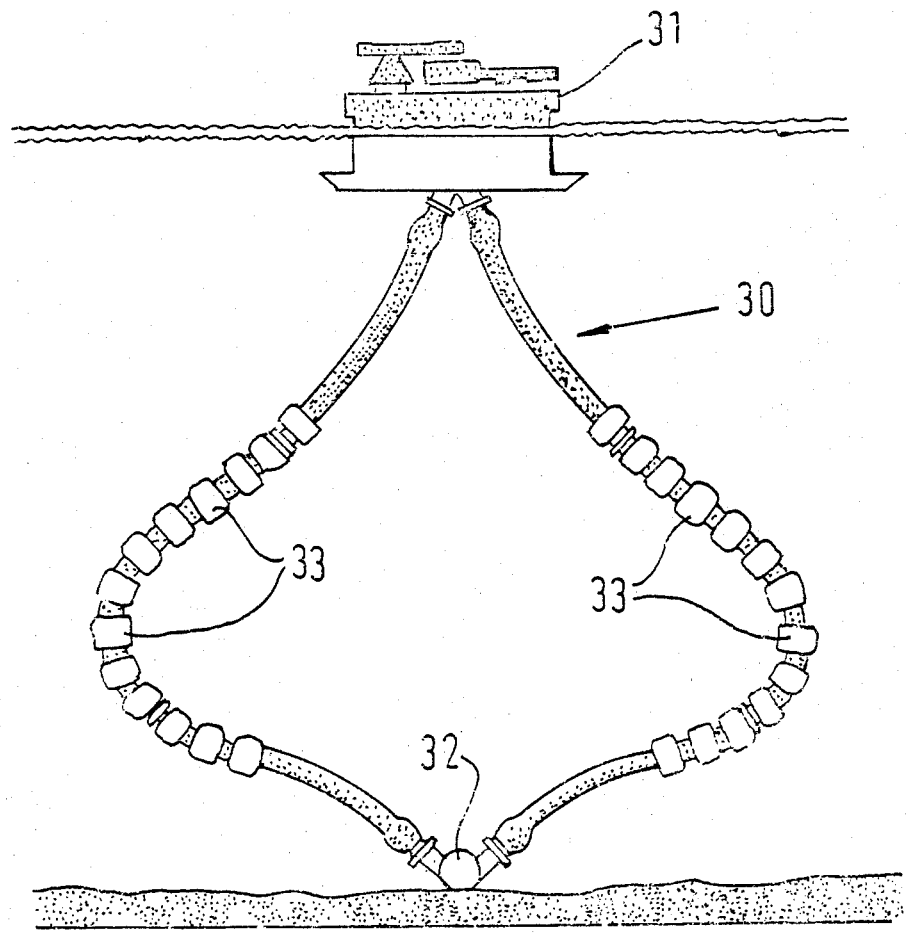
Figure 6:
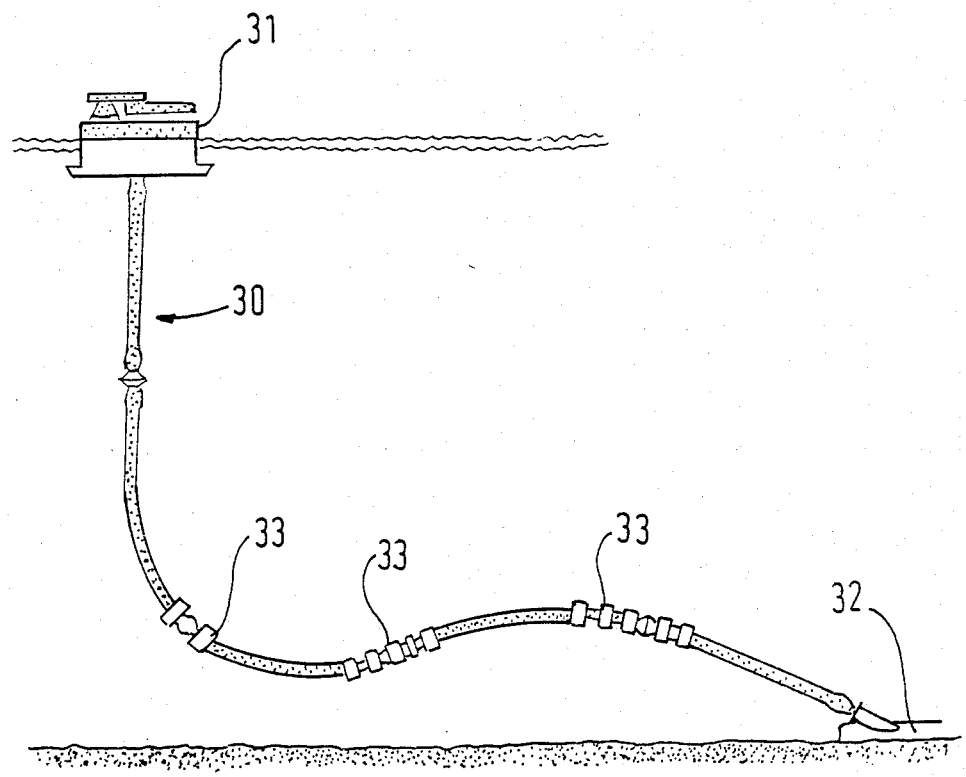

FIGS. 4 to 6 are schematic representations of three typical installations in which the flexible hose above described may be incorporated. In each installation several lengths of flexible hose are connected end to end to form a hose line 30 extending between a floating buoy 31 and a submerged pipeline 32. The floating buoy 31 may typically be connected to a tanker (not shown) and the submerged pipeline 32 connected to an on-shore installation for loading or unloading the tanker. In each installation at least one of the hoses in the pipeline or the end fitting(s) connecting successive lengths of hose is/are provided with external flotation collars 33 whereby the hoseline is constrained to a particular configuration which minimises stresses in the hose line. It will be appreciated that any significant change in the underwater weight of any length of hose within such a hose-line will alter the buoyancy thereof which if significant can result in the optimum configuration of the hose line being altered leading to the generation of undesirable stresses in the hose line and possible failure thereof. The hose according to the present invention overcomes this problem by ensuring any leak from the main carcass is detected before a significant change in the underwater weight and hence buoyancy of the hose length occurs and therefore before the hose line is disturbed from the optimum configuration.

The invention is not restricted to the above described embodiment which may be modified in a number of ways. For example the number and area of the axial and circumferential bonds between the main and secondary carcasses may be varied to suit the load requirements of differing sizes or constructions of hose while the circumferential bonding at a particular axial location may be discontinuous as described or continuous in the circumferential direction, especially where detection of leaked fluid is effected at positions other than the end fittings e.g. where a device is arranged to detect radial expansion of the secondary carcass. Furthermore radial expansion of the secondary carcass may be controlled by a combination of bonding and hoop plies as described or by the use of either separately. The hoop plies may be replaced by any other suitable annular reinforcement structure e.g. rings of metal of plastics material. The use of flotation collars may be avoided by incorporating one or more layers of buoyancy material in the hose.

Having now described my invention what I claim is:

1. A flexible hose comprising a main fluid retaining carcass, a secondary fluid retaining carcass which encloses at least part of said main carcass and is capable of expanding radially relative to said main carcass in response to leakage of fluid from said main carcass and means to control radial expansion of said secondary carcass relative to said main carcass at positions spaced axially along the length of the hose comprising a bonding of said secondary carcass to said main carcass at said positions spaced axially along the length of said hose.

2. A hose according to claim 1 wherein said bonding at each axial position is discontinuous in the circumferential direction.

3. A hose according to claim 1 wherein radial expansion of said secondary carcass relative to said main carcass is controlled by reinforcing said secondary carcass at a plurality of positions spaced axially along the length of the hose and corresponding to said positions at which said secondary carcass is bonded to said main carcass.

4. A hose according to claim 1 wherein said main and secondary carcasses each include a reinforcement structure and said secondary carcass reinforcement structure is formed from a material having a substantially higher elongation than the material forming said main carcass reinforcement structure.

5. A hose according to claim 1 wherein said secondary carcass encloses the entire length of said main carcass and both said main and secondary carcasses are separately connected at each end to a respective end fitting.

6. A hose according to claim 1 including buoyancy material.

7. A hose according to claim 1 including means for detecting leakage of fluid from said main carcass.

8. A hose-line incorporating flexible hose according to claim 1.

* * * * *